April 19, 1927.

L. H. KENNON ET AL 1,625,367

VALVE

Filed April 6, 1925

Louis H. Kennon
Louree J. Langdon INVENTORS
BY
Hardway Cathey
ATTORNEYS

Patented Apr. 19, 1927.

1,625,367

UNITED STATES PATENT OFFICE.

LOUIS H. KENNON AND LOWELL J. LANGDON, OF HOUSTON, TEXAS.

VALVE.

Application filed April 6, 1925. Serial No. 21,184.

This invention relates to new and useful improvements in a valve.

One object of this invention is to provide a valve specially designed for use in a high pressure pump designed for pumping thick mud-laden fluid or slush, and so constructed as to be very durable.

Another object of the invention is to provide a valve of the character described, having a novel type of packing which will not be readily worn away by the fluid being pumped and which will render the pump, in which it is used, much more durable and efficient.

With the above and other objects in view this invention has particular relation to certain and novel features of construction, operation and arrangement of parts, an example of which is given in this specification and illustrated in the accompanying drawings, wherein.

Figure 1:
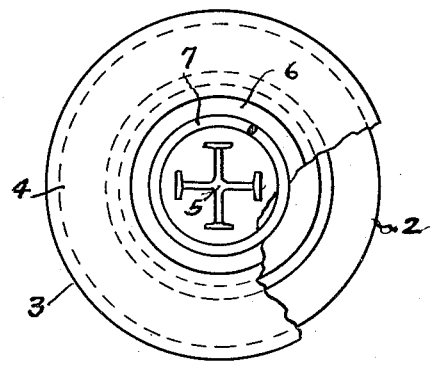
Figure 1 shows a plan view of the valve, partly broken away.
Figure 2:
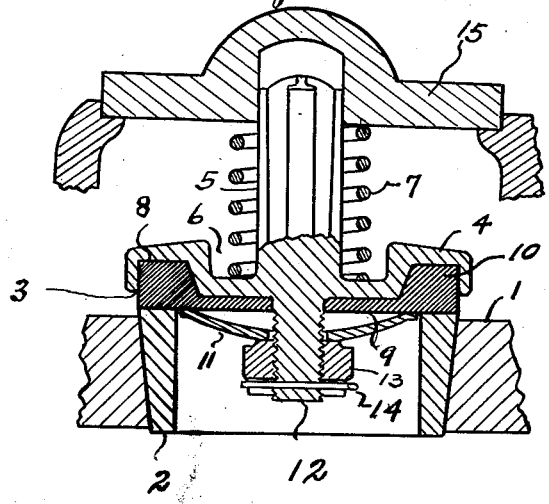
Figure 2 shows a vertical view thereof.

Referring now more particularly to the drawings, wherein like numerals of reference designate similar parts in each of the figures, the numeral 1 designates the top part of the water cylinder, seated in which there is the annular valve seat 2. Co-operating with this seat there is a valve designated, as a whole, by the numeral 3. This valve is formed with an annular plate 4, having a central upstanding stem 5, surrounding which there is an annular groove 6 forming a seat for the lower end of the coil spring 7 which surrounds said stem.

The underside of the plate 4 has a marginal groove 8, forming a seat for the valve packing. This packing consists of the disc 9 formed of hard rubber or other suitable material and having an integral annular marginal rib 10 designated to fit snugly in the groove 8. This packing is held in place by the disclike concavo-convex support 11 having a central opening to receive the externally threaded stud 12 which is integral with, and depends from the plate 4. The support is retained in place by means of a lock nut 13, which is threaded onto said stud up against the underside of said support, and is secured thereon by the cotter key 14. The margin of the support is thus clamped against the disc 9 and holds the packing securely in place.

The valve is normally held closed by the spring 7, whose upper end presses against the valve guide 15 in which the stem 5 works, but is lifted by the pressure to permit the passage of fluid through the seat 7.

Heretofore the packing has been constructed ring like in form and seated in the groove 8; but that construction permits sand and grit to work in between the margin of the support 11, and the packing and the great pressure soon causes said sand and grit to cut the packing out causing the valve to leak.

In the construction herein described the disc 9 completely excludes the sand and grit from working into the grooves 8 and cutting out the packing and the life of the valve is thereby materially lengthened.

What we claim is:

1. A valve including a central plate having an upstanding stem and a central depending stud, said plate having an annular groove around the stem forming a seat and having an annular marginal groove on its under side, a resilient disc having a central opening to receive said stud and having a marginal rib which fits into said last named groove and a resilient concavo-convex disc beneath the first mentioned disc for supporting said first mentioned disc.

2. A valve including a central plate having an upstanding stem, and a central depending stud, said plate having an annular groove around the stem forming a seat and having an annular marginal groove on its under side, a resilient disc having a central opening to receive said stud and having a marginal rib which fits into said last named groove, a concavo-convex support having a central opening to receive said stud and whose margin fits against the under side of said disc and a nut threaded on-to the lower end of the stud and abutting the under side of said support.

In testimony whereof we have signed our names to this specification.

LOUIS H. KENNON.
LOWELL J. LANGDON.